United States Patent
Huang et al.

(10) Patent No.: US 7,162,568 B2
(45) Date of Patent: Jan. 9, 2007

(54) APPARATUS AND METHOD FOR FLASH ROM MANAGEMENT

(75) Inventors: Chung-Ching Huang, Taipei (TW); Kuan-Jui Ho, Taipei (TW)

(73) Assignee: VIA Technologies, Inc., Taipei (TW)

( * ) Notice: Subject to any disclaimer, the term of this patent is extended or adjusted under 35 U.S.C. 154(b) by 344 days.

(21) Appl. No.: 10/757,464

(22) Filed: Jan. 15, 2004

(65) Prior Publication Data

US 2004/0255075 A1 Dec. 16, 2004

(30) Foreign Application Priority Data

Jun. 11, 2003 (TW) .............................. 92115806 A

(51) Int. Cl.
*G06F 12/00* (2006.01)
(52) U.S. Cl. .......................... 711/102; 711/5
(58) Field of Classification Search ............... 711/102, 711/5
See application file for complete search history.

(56) References Cited

U.S. PATENT DOCUMENTS

| | | | | |
|---|---|---|---|---|
| 5,592,652 A | * | 1/1997 | Hongo et al. ............... 711/170 |
| 5,922,055 A | * | 7/1999 | Shahar et al. .............. 710/16 |
| 6,745,329 B1 | * | 6/2004 | Kao ............................. 726/24 |
| 2002/0049880 A1 | * | 4/2002 | Poisner ....................... 711/1 |
| 2003/0182495 A1 | * | 9/2003 | Chang et al. ............... 711/103 |
| 2004/0250063 A1 | * | 12/2004 | Gulick et al. ............... 713/160 |

OTHER PUBLICATIONS

Corporate News: ATMEL Corporation "AMI Supports Atmel's Firmware Hub Flash and LPC Flash for PC BIOS Applications" 2003.

* cited by examiner

*Primary Examiner*—Matthew Kim
*Assistant Examiner*—Shane M. Thomas
(74) *Attorney, Agent, or Firm*—Rabin & Berdo, P.C.

(57) ABSTRACT

An apparatus and method of flash ROM management. The apparatus comprises a storage device, a strapping component and a process unit. The storage device stores multiple address records comprising an identity and an address range associated with a flash ROM. The strapping component is configured to output a signal to determine flash ROM type. The process unit receives a memory access request with an access range from the CPU and the signal from the strapping component queries the identity by matching the access range and the address range, and finally executes an LPC 1.1 memory access instruction with the identity and the access range corresponding to the memory cycle.

20 Claims, 6 Drawing Sheets

| Item No. | Base 0 | Memory Size | IDSEL | BIOS Flag |
| --- | --- | --- | --- | --- |
| 0 | FFF8_0000H | 512K | 0 | 1 |
| 1 | FFF0_0000H | 512K | 1 | 1 |
| 2 | FFEC_0000H | 256K | 2 | 0 |
| 3 | FFEA_0000H | 128K | 3 | 0 |

FIG. 5

| Item No. | Base 0 | Memory Size | IDSEL | BIOS Flag |
| --- | --- | --- | --- | --- |
| 0 | FFF8_0000H | 512K | 1 | 1 |
| 1 | FFF0_0000H | 512K | 0 | -1 |
| 2 | FFEC_0000H | 256K | 2 | 0 |
| 3 | FFEA_0000H | 128K | 3 | 0 |

FIG. 6

APPARATUS AND METHOD FOR FLASH ROM MANAGEMENT

BACKGROUND OF THE INVENTION

1. Field of the Invention

The present invention relates to memory management, and more particularly to a method and apparatus for flash ROM management.

2. Description of the Related Art

Computer systems include various types of memory devices. Some memory devices are referred to as "volatile" meaning that data stored therein will be lost if when powered off. Other memory devices are "non-volatile" meaning that data is retained when powered off.

Volatile memory, such as dynamic random access memory (DRAM), or more specifically synchronous DRAM (SDRAM), is typically employed as the main memory of a computer. When booted, the computer operating system is loaded to the main system memory and executed by the processor. As applications are opened they are copied from the storage drive (e.g., hard drive, CD-ROM drive) into the main system memory for execution. The main system memory is also used to temporarily store data, configuration, and other types of information that the computer may require during operation.

Non-volatile memory is useful for storing software code that the computer may execute each time it is booted, typically referred to as firmware. Most computers have a set of executable routines called the basic input/output system (BIOS). Said routines provide access to various input and output devices such as floppy disk drives, displays, and the like. The BIOS is permanently stored in a non-volatile memory device called a read only memory (ROM).

It may be desirable to update the firmware stored in the ROM to enhance performance for example, and some types of ROM devices permit firmware updates, and electrically erasable programmable read only memory (EEPROM) ROM is an example. To reprogram an EEPROM (a process referred to as flashing the ROM), the data stored therein is first erased and new data is then stored in the device.

Of the ROM devices which are compatible with low pin count interface specification revision 1.1 (LPC 1.1), the most commonly used are flash ROMs which are typically coupled to a motherboard. The flash ROM stores the system BIOS, the operating system and various application data.

Two types of flash ROM, LPC flash ROM and firmware hub flash ROM forwarded by the Intel Corporation, are adaptable by current motherboards. These two types of flash ROM have different bandwidths and are accessed by isolated memory cycles with particular command sets. The selection of flash ROM type is based on the requirements of the motherboard designer (e.g. cost, performance, and function). FIG. 1 is a timing diagram of conventional LPC memory cycle. FIG. 2 is a timing diagram of a conventional firmware hub memory cycle. Although both cycles use the "LFRAME#" bus line to provide a starting signal, the information content, such as controlling signals, commands, or data, transferred via four "LAD" bus lines associated with specific timing, is different.

Only one type of flash ROM can be disposed on a motherboard, hence, in order to accommodate both types of flash ROM, two host versions have been provided respectively, resulting in extra cost. It is therefore necessary to produce a single host version providing the ability to utilize both types of flash ROM. It is additionally, necessary to determine which type of flash ROM is present before the power on self test (POST) procedure is conducted.

In a firmware hub flash ROM, multiple ROM devices of various sizes can be disposed on a motherboard. To accommodate all ROM devices, each ROM device is allocated address space equal to the address space required by the ROM device with the largest memory capacity. Although the solution above is feasible, several problems remain. It is unnecessary to allocate redundant address space to a firmware hub flash ROM which has a smaller memory capacity. For example, to allocate address space to a flash ROM with 64K capacity when a 256K address space is allocated to another ROM device, 192K of excess address space goes unused. Hence, an additional need exists for an apparatus and method of flash ROM management to precisely allocate address space corresponding to the actual capacity of firmware flash ROMS.

SUMMARY OF THE INVENTION

It is therefore an object of the present invention to provide an apparatus and method of flash ROM management providing a single version to access both types of flash ROM. According to the invention, the apparatus includes a storage device, a strapping component, a process unit and a configuration unit.

The storage device stores multiple address records associated with firmware hub flash ROMs, in which records are stored in a table. The address record preferably includes three fields, an "IDSEL" number, an address range and a BIOS flag. The strapping component outputs a signal, such as "on" or "off", to determine which type of flash ROM is disposed before conducting the power on self test (POST) procedure.

The process unit first determines which type of flash ROM is disposed on the motherboard according to the signal output from the strapping component after receiving a memory access request with an access range. If low pin count (LPC) flash ROM is present, an LPC memory instruction with the access range corresponding to the LPC memory cycle is executed. Otherwise, it queries an "IDSEL" number from the address records by matching the access range and the address range and then executes a firmware hub (FWH) memory instruction with the "IDSEL" number and access range corresponding to the firmware hub memory cycle.

The configuration unit looks up the next available system BIOS based on the BIOS flag from the address record, exchanges "IDSEL" numbers for the broken flash ROM to the regular one, replaces the BIOS flag of the broken one with −1, and finally reboots the system for basic input/output system (BIOS) recovery.

The apparatus and method of this invention executes an LPC or firmware hub memory instruction corresponding to the relevant memory cycle according to a signal output from a strapping component and address records. The system is re-booted to determine the flash ROM type prior to the power on self test (POST) procedure. In addition, the address range for each firmware hub flash ROM is allocated and recorded in the address record, thereby facilitating further access and preventing over allocation of address space.

BRIEF DESCRIPTION OF THE DRAWINGS

The present invention can be more fully understood by reading the subsequent detailed description and examples with references made to the accompanying drawings, wherein:

FIG. 5 is a diagram of an exemplary address record according to the embodiment of the present invention;

FIG. 6 is a diagram of the exemplary reconfigured address record according to the embodiment of the present invention;

DETAILED DESCRIPTION OF THE INVENTION

Figure 1:
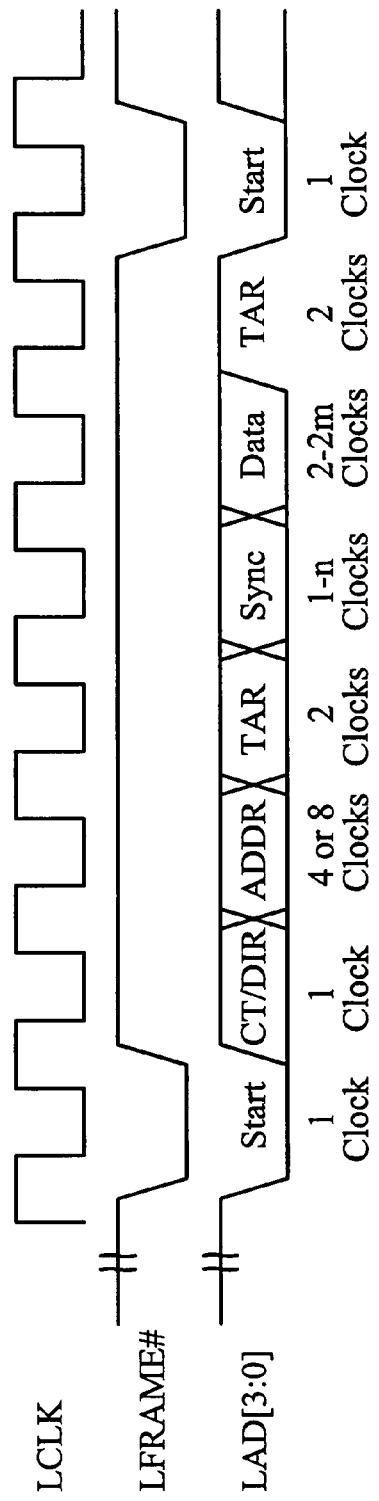
FIG. 1 is a timing diagram of conventional LPC memory cycle.
Figure 2:
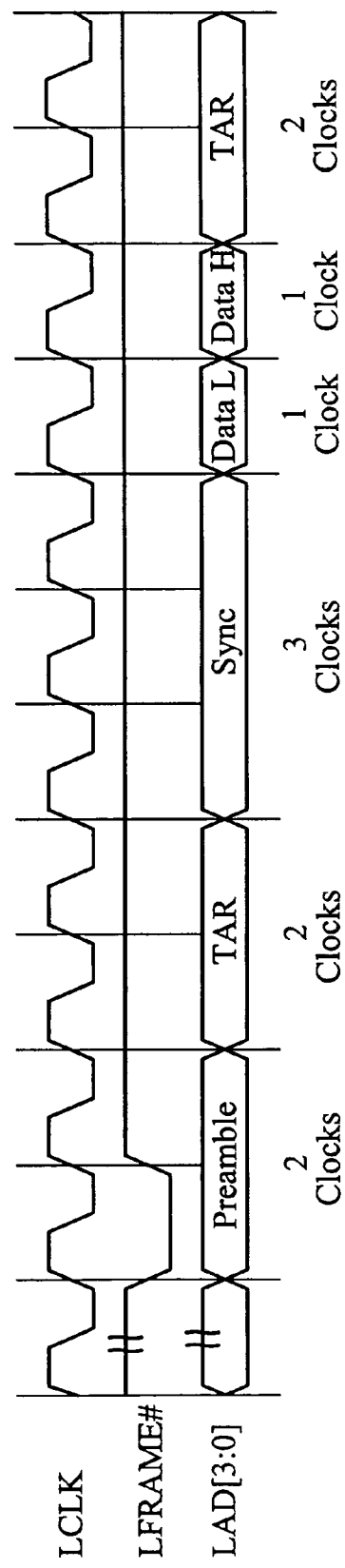
FIG. 2 is a timing diagram of conventional firmware hub memory cycle.
Figure 3:
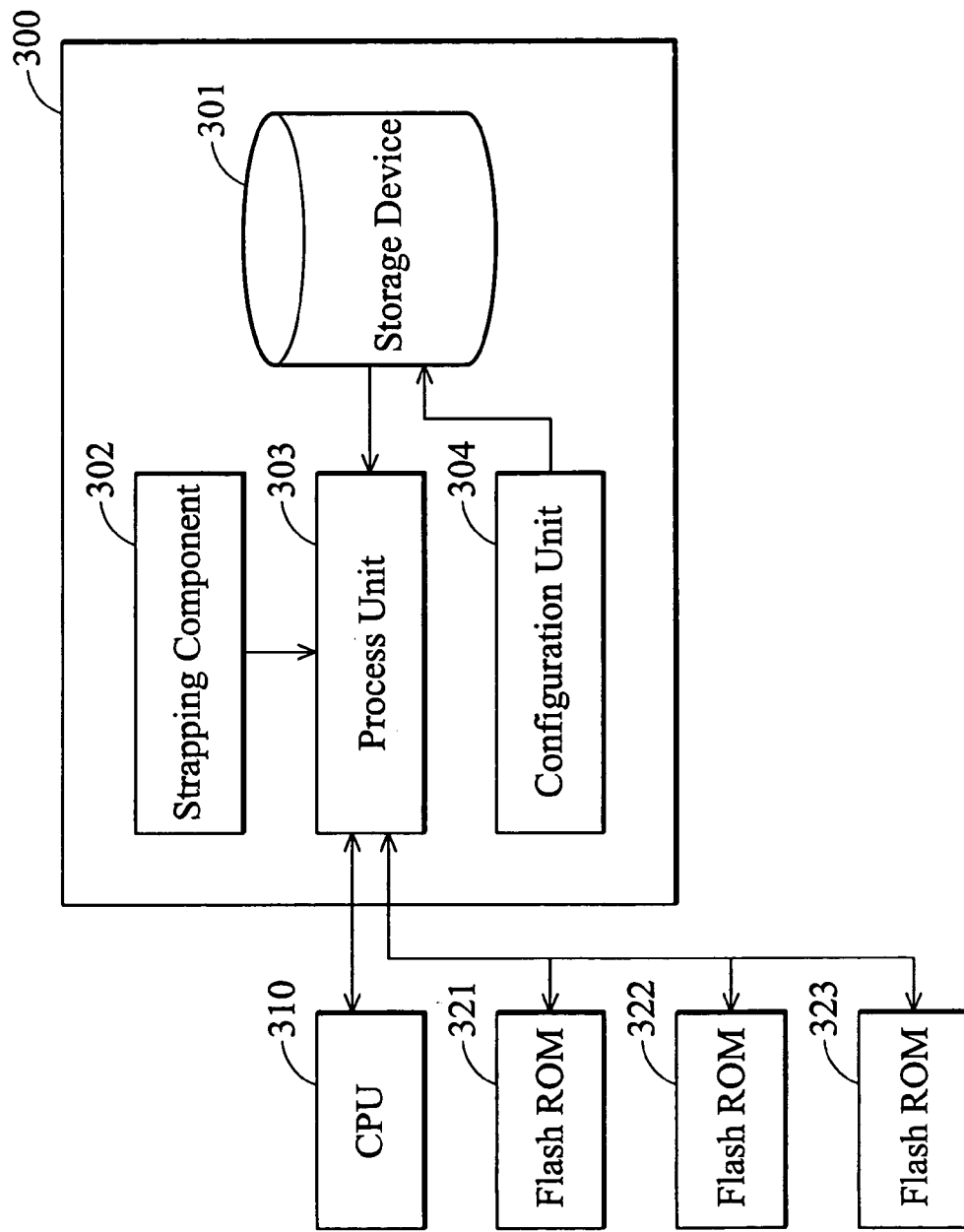
FIG. 3 is a diagram of the architecture of the flash ROM management apparatus according to an embodiment of the invention.

FIG. 3 is a diagram of the architecture of an apparatus of flash ROM management according to an embodiment of the invention. According to the embodiment of the invention, the apparatus 300 includes a storage device 301, a strapping component 302, a process unit 303 and a configuration unit 304.

The storage device 301 stores multiple address records associated with firmware hub flash ROMS, in which records are stored into a table structure, and the flash ROM can be a read only memory (ROM), an electrically erasable programmable read only memory (EEPROM) or other "non-volatile" memories. The address record preferably includes three fields, an "IDSEL" number, an address range and a BIOS flag. The "IDSEL" number field stores a number related to a firmware hub flash ROM. The address range field stores a pair comprising a base address and an end address, or the base address and a memory size to represent occupied address space for each firmware hub flash ROM.

Figure 4:
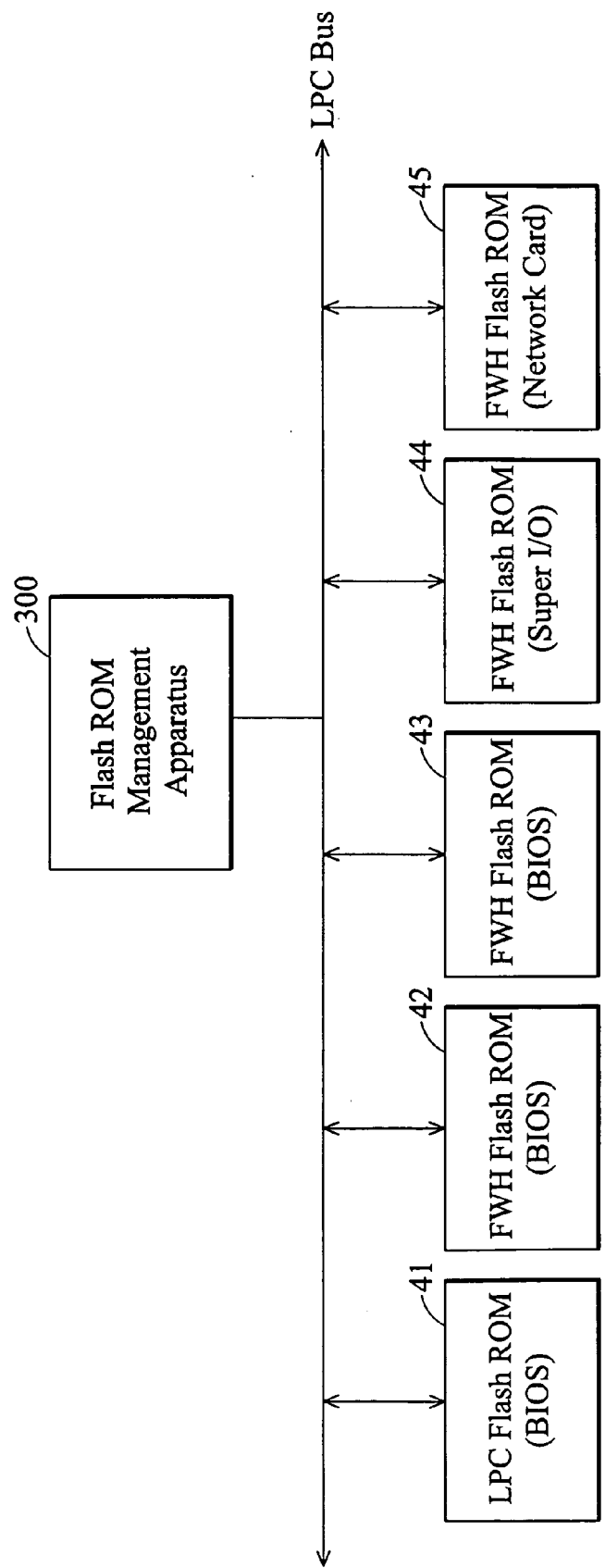
FIG. 4 is a diagram of the architecture of flash ROMs according to the embodiment of the invention.

FIG. 4 is a diagram of the architecture of flash ROMs according to the embodiment of the invention. The apparatus 300 manages two types of flash ROM, LPC flash ROM 41 and firmware hub flash ROMs 42 to 45, compatible with low pin count interface specification revision 1.1 (LPC 1.1). The apparatus 300 is designed to enable access to both types of flash ROM to reduce costs. It is noted that only one type of flash ROM is disposed on one motherboard. Preferably, only one ROM is provided to store the basic input/output system (BIOS) when the LPC flash ROM is disposed. However, multiple ROMs of various sizes can be provided to respectively store system BIOS, super I/O or network card data when the firmware hub flash ROM is disposed.

FIG. 5 is a diagram of an exemplary address record according to the embodiment of the present invention. The storage device 301 contains four address records, in which the item numbers range from 0 to 3, and correspond to firmware hub flash ROMs 42 to 45. The firmware hub flash ROM 42, referring to the BIOS flag 1 when the IDESEL is 0, stores a system BIOS required to boot the system, occupies 512K of address space between FFF8_0000H and FFFF_FFFFH. The firmware hub flash ROM 43, referring to the BIOS flag 1 when the IDESEL is 1, occupies 512K of address space ranging from FFF0_0000H to FFF7_FFFFH, and stores the redundant system BIOS for system BIOS recovery. The keyboard mapping matrix data fort the embedded KBC controller is stored in the firmware hub flash ROM 44 when the IDSEL is 2, occupies 256K of address space ranging from FFEC_0000H to FFEF_FFFFH. The network card data is stored in the firmware hub flash ROM 45 when the IDSEL is 3, occupies 128K of address space between FFEA_0000H and FFEB_FFFFH.

The strapping component 302 outputs a signal, such as "on" or "off", to determine which type of flash ROM is present before conducting the power on self test (POST) procedure, and is a hardware component, preferably a strapping pin.

The process unit 303 is responsible for executing an LPC memory access instruction corresponding to a memory access request, such as memory read or memory write requests, from the CPU 310. After receiving a memory access request with an access range, the process unit 303 first determines which type of flash ROM is present according to the signal output from the strapping component 302. If the LPC flash ROM is disposed, it executes an LPC memory access (e.g., read or write) instruction with the access range corresponding to the LPC memory cycle to read data from or write to the particular memory device. Otherwise, it queries an "IDSEL" number from the address records by matching the access range and the address range and then executes a firmware hub memory access (e.g., read or write) instruction with the "IDSEL" number and access range corresponding to the firmware hub memory cycle, and finally, reads data from or writes to the particular firmware hub flash ROM 321, 322 or 323.

Figure 7:
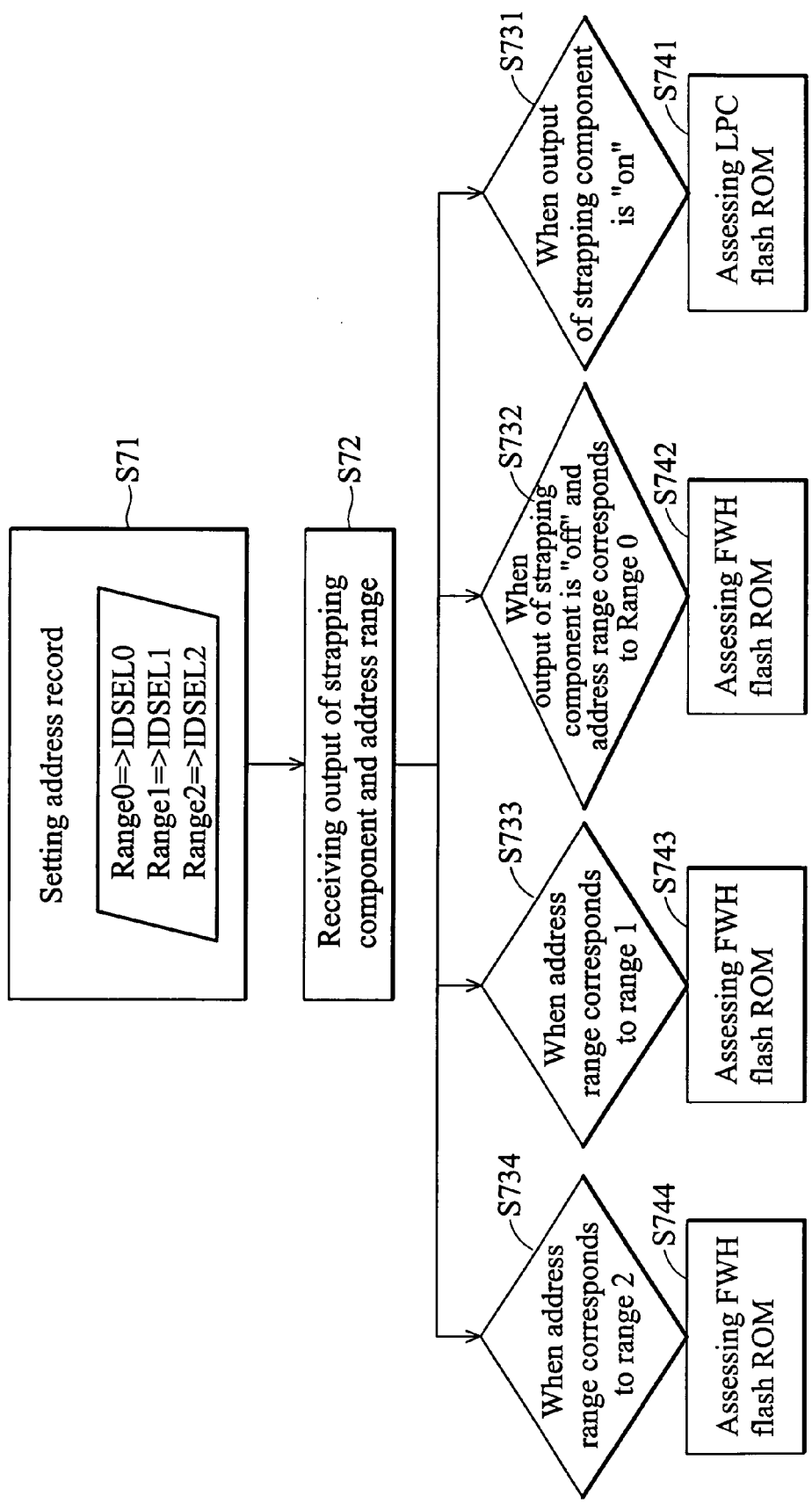
FIG. 7 is a flowchart showing a method of firmware hub flash ROM selection according to the embodiment of the invention.

FIG. 7 is a flowchart showing a method of firmware hub flash ROM selection according to the embodiment of the invention. The apparatus 300 includes a storage device 301 storing multiple address records associated with firmware hub flash ROMs. First, the address record is set at step S71. In step S72, the process unit 301 receives the signal output from the strapping component and a memory access request with an access range from the CPU 310. As in S731, when the signal is "on" meaning only one LPC flash ROM is disposed, it accesses the LPC flash ROM, and preferably reads the system BIOS to reboot the system according to the access range. In S732, when the strapping component is set to "off" and the access range corresponds to range 0, it controls the firmware hub flash ROM, and preferably reads system BIOS, with "IDSEL" number 0. Otherwise, in S733, and S734, when the address range corresponds to range 1 or range 2, it controls the firmware hub flash ROM with "IDSEL" number 1 or 2.

FIG. 6 is a diagram of the exemplary reconfigured address record according to the embodiment of the present invention. When detecting the firmware hub flash ROM at startup, if the stored system BIOS fails or the system BIOS is damaged, an error message is sent to the configuration unit 304. The configuration unit 304 looks up the next available system BIOS number according to the BIOS flag and exchanges "IDSEL" numbers from the failed firmware hub flash ROM with an available number, then replaces the failed BIOS flag with −1 indicating that is has failed, and finally reboot the system. After the system reboots, the process unit 303 reads the available system BIOS from the reconfigured address record.

Figure 8:
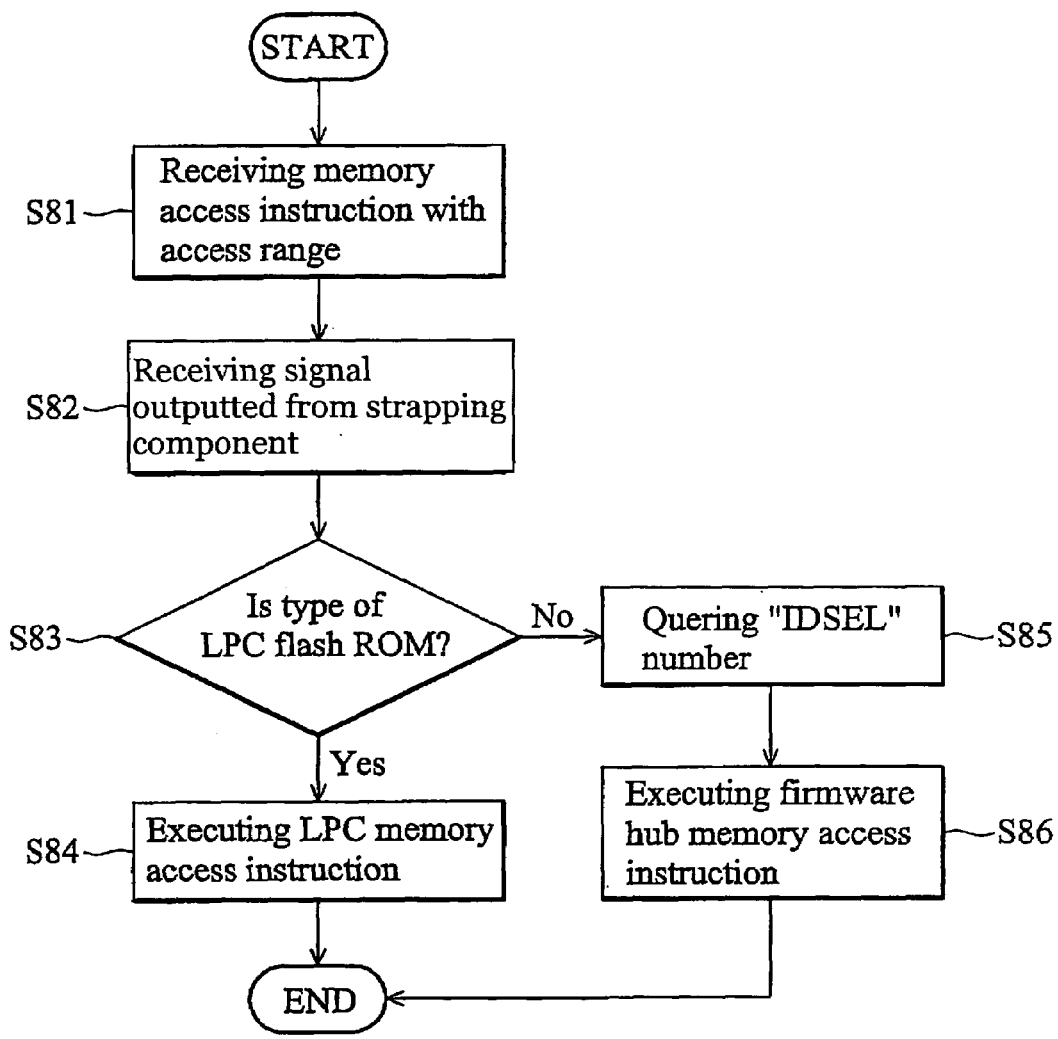
FIG. 8 is a flowchart showing a method of flash ROM management according to the embodiment of the invention.

FIG. 8 is a flowchart showing a method of flash ROM management according to the embodiment of the invention.

First, in step S81, the process unit 303 receives a memory access request, such as a memory read or memory write request, with an access range from the CPU 310. In step S82, a signal output from the strapping component 302 is received, indicating which type of flash ROM is present. In step S83, determines whether the memory device is LPC flash ROM, if so, the process proceeds to step S84 to execute an LPC memory access instruction with access range corresponding to the LPC memory cycle, otherwise, the process proceeds to step S85 to obtain an "IDSEL" number from address records according to the access range and subsequently executes a firmware hub memory access instruction with the access range and the "IDSEL" number, corresponding to the firmware hub memory cycle.

Although the order of the method has been described in a preferred embodiment, it is not intended to limit the method to the precise order disclosed herein. Those skilled in the technology can perform variations without departing from the scope and spirit of this invention.

The apparatus and method of this invention executes an LPC or firmware hub memory instruction corresponding to the relevant memory cycle according to a signal output from a strapping component and address records. The system boot requirement is met by determining the flash ROM type prior to the power on self test (POST) procedure. In addition, the address range for each firmware hub flash ROM is precisely allocated and recorded in the address record, thereby facilitating further access and preventing over allocation of address space.

Although the present invention has been described in its preferred embodiments, it is not intended to limit the invention to the precise embodiments disclosed herein. Those who are skilled in this technology can still make various alterations and modifications without departing from the scope and spirit of this invention. Therefore, the scope of the present invention shall be defined and protected by the following claims and their equivalents.

What is claimed is:

1. A flash ROM management apparatus, comprising:
   a storage device capable of storing a plurality of address records, each address record comprising an identity and an address range associated with one of a plurality of flash ROMs;
   a strapping component, configured to output a signal indicating one of a plurality of flash ROM types corresponding to the flash ROMs; and
   a process unit, coupled to the storage device and the strapping component, receiving a memory access request with an access range from a CPU, receiving the signal, determining the indicated flash ROM type according to the signal, querying the identity by matching the access range and one of the address ranges in the address records, and executing an LPC 1.1 memory access instruction with the identity and the access range corresponding to a memory cycle.

2. The apparatus as claimed in claim 1 wherein the identity is an "IDSEL" number associated with one of a plurality of firmware hub flash ROMs.

3. The apparatus as claimed in claim 1 wherein the address range is a pair comprising a base address and an end address.

4. The apparatus as claimed in claim 1 wherein the address range is a pair comprising a base address and memory size.

5. The apparatus as claimed in claim 1 wherein the flash ROM type is an LPC flash ROM or a firmware hub flash ROM.

6. The apparatus as claimed in claim 1 wherein the memory access request is a memory read request or a memory write request.

7. The apparatus as claimed in claim 1 wherein, in the process unit, the LPC 1.1 memory access instruction is an LPC memory read instruction or an LPC memory write instruction, and the LPC memory read instruction or the LPC memory write instruction corresponds to a LPC memory cycle.

8. The apparatus as claimed in claim 1 wherein, in the process unit, the LPC 1.1 memory access instruction is a firmware hub memory read instruction or a firmware hub memory write instruction, and the firmware hub memory read instruction or the firmware hub memory write instruction corresponds to a firmware hub memory cycle.

9. The apparatus as claimed in claim 1 wherein a basic input/output system (BIOS) flag within each address record indicates whether the system BIOS is stored in flash ROM.

10. The apparatus as claimed in claim 9 further comprising a configuration unit detecting an error message indicating system BIOS failure, and resetting the BIOS flag for further reboot.

11. A method of flash ROM management, comprising using a computer to perform the steps of:
    receiving a memory access request with an access range from a CPU;
    receiving a signal indicating one of a plurality of flash ROM types corresponding to a plurality of flash ROMs output from a strapping component;
    inputting a plurality of address records, wherein each address record comprises an identity and an address range associated with one of a plurality of flash ROMs;
    querying the identity by matching the access range and one of the address ranges in the address records; and
    executing an LPC 1.1 memory access instruction with the access range and identity corresponding to a memory cycle.

12. The method as claimed in claim 11, wherein the memory access request is a memory read request or a memory write request.

13. The method as claimed in claim 11, wherein the identity is an "IDSEL" number associated with one of a plurality of firmware hub flash ROMs.

14. The method as claimed in claim 11, wherein the address range is a pair comprising a base address and end address.

15. The method as claimed in claim 11, wherein the address range is a pair comprising a base address and memory size.

16. The method as claimed in claim 11, wherein, in the step of executing an LPC 1.1 memory access instruction with the access range and the identity corresponding to memory cycle, the LPC 1.1 memory access instruction is an LPC memory read instruction or an LPC memory write instruction corresponding to LPC memory cycle.

17. The method as claimed in claim 11, wherein, in the step of executing an LPC 1.1 memory access instruction with the access range and the identity corresponding to memory cycle, the LPC 1.1 memory access instruction is a firmware hub memory read instruction or a firmware hub memory write instruction corresponding to the firmware hub memory cycle.

18. The method as claimed in claim 11, wherein the signal is received before conducting power on self test (POST) procedure.

19. A flash ROM management apparatus, comprising:

at least one flash ROM corresponding to one of a plurality of flash ROM types;

a strapping component, configured to output a signal indicating the flash ROM type corresponding to the flash ROM before conducting power on self test (POST) procedure; and a process unit, coupled to the flash ROM and the strapping component, receiving a memory access request with an access range from the a CPU, receiving the signal, acquiring the flash ROM type according to the signal, and executing an LPC 1.1 memory access instruction with the access range corresponding to a memory cycle corresponding to the flash ROM type.

20. The apparatus as claimed in claim 19, wherein the flash ROM types comprise an LPC flash ROM and a firmware hub flash ROM.

* * * * *